United States Patent
Matsufuru

(10) Patent No.: US 7,218,639 B2
(45) Date of Patent: May 15, 2007

(54) NETWORK SYSTEM, TRANSMISSION METHOD, AND COMPUTER PROGRAM

(75) Inventor: Norio Matsufuru, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 1129 days.

(21) Appl. No.: 10/284,244

(22) Filed: Oct. 31, 2002

(65) Prior Publication Data

US 2003/0081625 A1    May 1, 2003

(30) Foreign Application Priority Data

Nov. 1, 2001    (JP)    ............... 2001-336722

(51) Int. Cl.
*H04L 12/28* (2006.01)
*H04L 12/56* (2006.01)
(52) U.S. Cl. .................... 370/412; 370/415
(58) Field of Classification Search ........ 370/389, 370/392, 400, 412–417, 428, 429, 535
See application file for complete search history.

(56) References Cited

U.S. PATENT DOCUMENTS 6,744,728 B1 *   6/2004  Chung ....................... 370/229
6,975,581 B1 *  12/2005  Medina et al. ............. 370/401
2004/0139071 A1 *  7/2004  Lee et al. ...................... 707/3

* cited by examiner

*Primary Examiner*—Ajit Patel
(74) *Attorney, Agent, or Firm*—Oblon, Spivak, McClelland, Maier & Neustadt, P.C.

(57) ABSTRACT

Queues which correspond to each of the LANs in multiplexed virtual LANs are created. Received packets are distributed to the queues in accordance with a VLAN-ID and a destination address included in each of the received packets. The packets are output from the respective queues in a predetermined order, thereby ensuring fairness among the virtual LANs. As a result, even if a user of a virtual LAN transmits data with traffic having a wide transmission band, the virtual LAN does not occupy the band of the physical port and does not hamper transmission of other users.

18 Claims, 5 Drawing Sheets

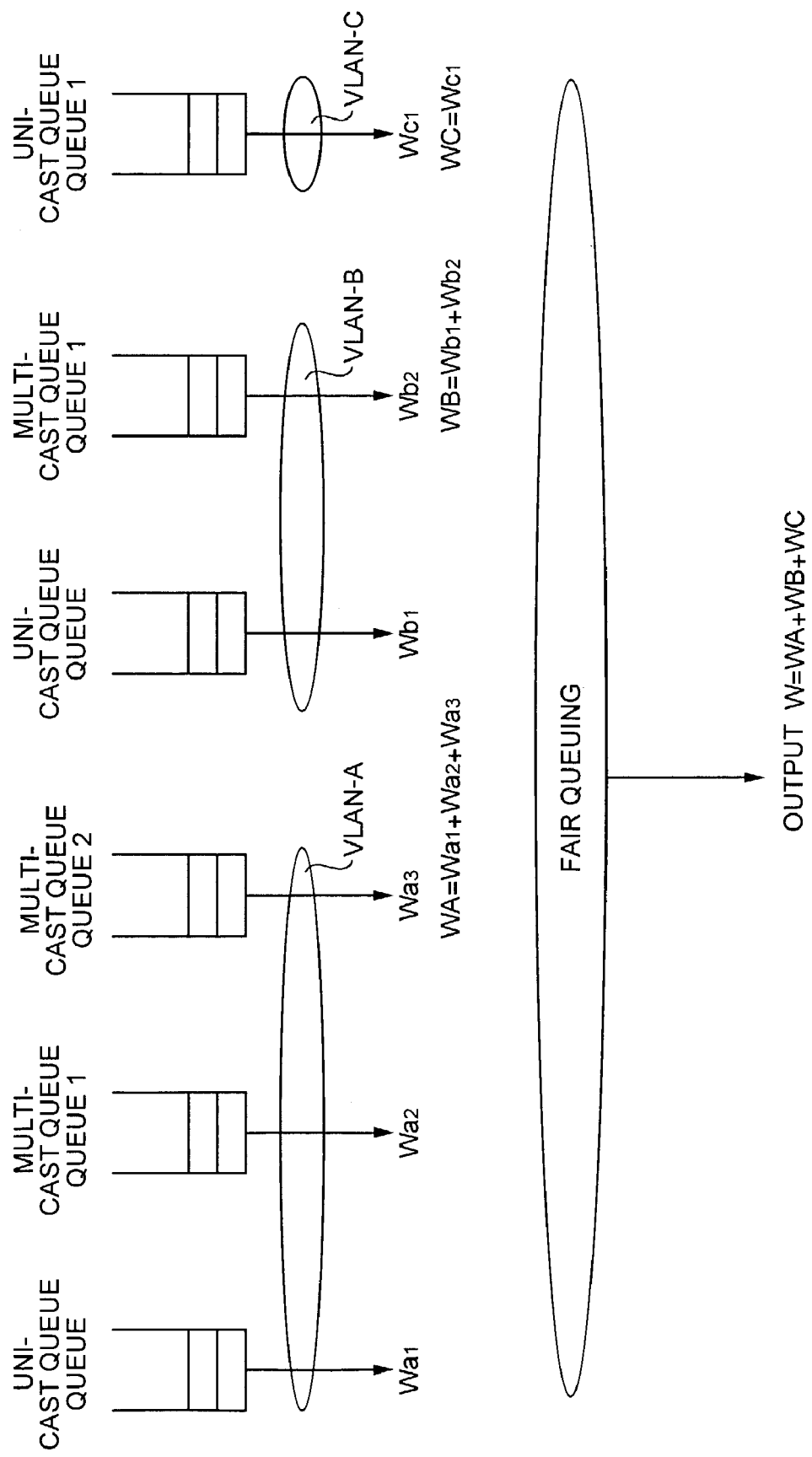

NETWORK SYSTEM, TRANSMISSION METHOD, AND COMPUTER PROGRAM

BACKGROUND OF THE INVENTION

1) Field of the Invention

The present invention relates to a network system which constitutes a virtual local area network (LAN), a transmission method and a computer program.

2) Description of the Related Art

As network systems, there is known a virtual LAN (VLAN) technique which virtually constitutes a LAN as if a plurality of different LANs exist at the same physical port. This technique is specified by IEEE802.1Q or the like and applied. According to this VLAN, tag identifiers (TPID) are provided in packets to be transmitted, respectively, thereby grouping terminal equipment or the like which are connected to LANs. For example, if a VLAN is constituted among a plurality of routers to each of which a plurality of terminals are connected, the terminals are grouped by identifying TPIDs in the packets which pass through the routers. Needless to say, if a VLAN is constituted among a plurality of switching hubs to each of which the terminals are connected, the terminals are grouped by identifying TPIDs, as well. Each router or switching hub exercises control so that data can be transmitted among the terminals which belong to the same group and that data cannot be transmitted on a data link layer among different groups. Therefore, from the terminal side, it appears that a plurality of different LANs exist. From the router or switching hub side, different VLANs can be multiplexed at the same physical port. It is, therefore, possible in the VLANs to decrease labor required to lay a network cable, labor required to switch over connection during regrouping or the like. Moreover, since data cannot be transmitted on the data link layer among different groups, it becomes advantageously easy to ensure security, manage terminal addresses by grouping LANs and the like.

However, bands which the users of VLAN thus multiplexed can utilize are preferentially allocated to a user who accesses the network precedently (precedence priority system). Therefore, if the user transfers data which has a wide transmission band, the data occupies all the bands of a physical link which constitutes the VLAN and the other users cannot hold communication.

SUMMARY OF THE INVENTION

It is an object of the present invention to provide a network system, a transmission method and a computer program which can ensure fairness in the allocation of bands to VLAN groups while securing the convenience of a VLAN, and which can prevent a heavy traffic user from occupying a physical port.

According to one aspect of the present invention, there is provided a network system which multiplexes a plurality of virtual LANs at a same physical port and transmits data, comprising a queue creation unit which creates queues which correspond to the respective virtual LANs in accordance with the number of the multiplexed virtual LANs a packet distribution unit which distributes received packets to the queues of the virtual LANs, to which the packets belong, in accordance with a virtual LAN-ID and a destination address included in each of the received packets, and a packet output unit which outputs the packets, which are distributed to the plurality of queues, from each of the queues in a predetermined order.

According to another aspect of the present invention, there is provided a network system comprising, a queue creation unit which creates queues which correspond to multicast groups delivered to each of multiplexed virtual LANs for each virtual LAN in accordance with the number of the multicast groups, a packet distribution unit which distributes received packets to the queues which correspond to one or both of unicast and multicast in accordance with a virtual LAN-ID and a destination address included in each of the received packets, and a packet output unit which outputs the packets respectively distributed to the queues from each of the queues in a predetermined order.

Therefore, according to the present invention, in the network system in which a plurality of virtual LANs are multiplexed at the same physical port, even if a user transmits a packet with heavy traffic, the physical port is not occupied and it is possible to ensure fair communication for the other network users. In addition, if the virtual LAN includes unicast and multicast and even if a packet with heavy traffic (in a wide band) is transmitted by multicast, it is possible to provide a network which can conduct fair transmission control without occupying the port similarly to the above.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 6 is a view which shows one example of queues prepared for a plurality of VLANs, respectively in the router shown in FIG. 3.

DETAILED DESCRIPTIONS

A network system, a transmission method and a computer program according to the present invention will be explained herein after with reference to the accompanying drawings.

Figure 1:
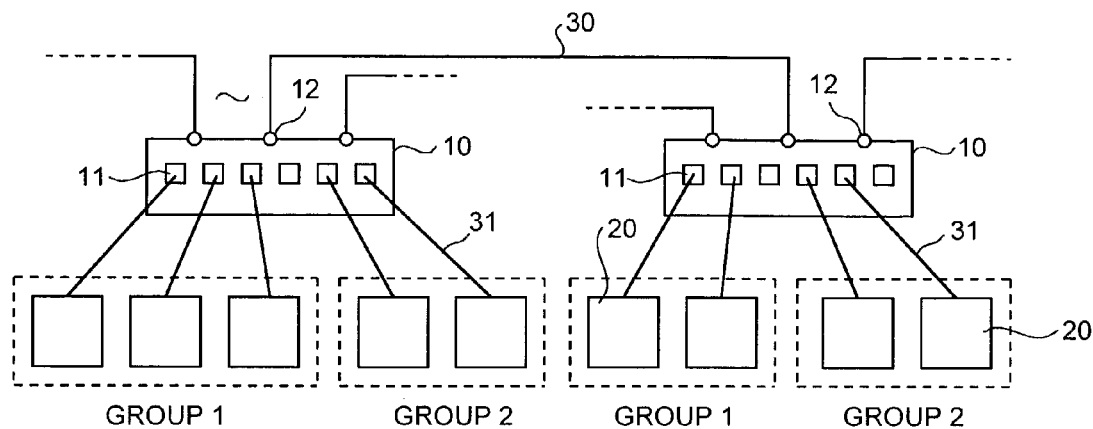
FIG. 1 is a schematic block diagram of a network system in an embodiment according to the present invention.

As shown in the schematic block diagram of FIG. 1, this network system is constituted so that a plurality of terminals 20 are connected, through branch transmission lines 31, to each of a plurality of routers 10 which are mutually connected through a trunk transmission line 30. A plurality of virtual LANs (VLANs) which are constructed on such a network system are realized by multiplexing virtual LANs on the same physical line (port) which constitutes the trunk transmission line 30 and each router 10 has a function of grouping the terminals 20 for each VLAN.

Figure 2:
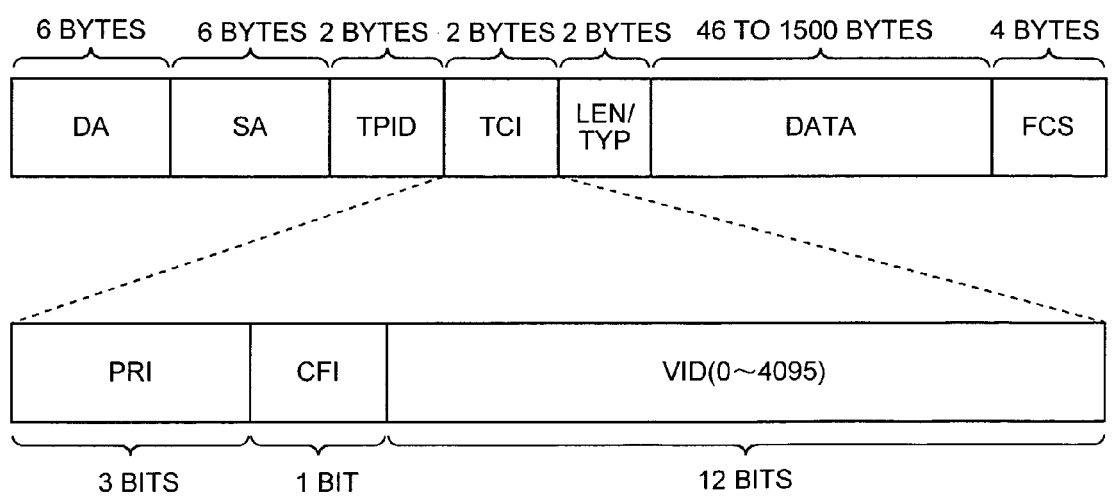
FIG. 2 is a view which shows one example of the frame structure of a packet dealt with by a virtual LAN.

Information which each terminal 20 communicates through the router 10 consists of packets each of which has a frame structure as shown in FIG. 2 specified, for example, according to IEEE802.1Q. The packet consists of a destination address DA of 6 bytes, a sender address SA of 6 bytes, a tag protocol identifier TPID of 2 bytes, tag identification information TCI of 2 bytes, a length/type information LEN/TYP of 2 bytes, MAC (media access control) client/data DATA having a variable length of 46 to 1500 bytes and a frame/check sequence FCS of 4 bytes.

The tag identification information TCI consists of user priority information PRI of 3 bits, a normal form identifier CFI of 1 bit and a virtual LAN identifier VID of 12 bits. The virtual LAN identifier VID of 12 bits is employed to identify a plurality of VLANs which are multiplexed on the same physical port as explained above. The VLANs are grouped into [0] to [4095] by this virtual LAN identifier VID.

Each router 10 includes a plurality of terminal ports 11 for connecting the terminals 20 through the branch transmission lines 31, respectively, and a plurality of trunk ports 12 to which the trunk transmission line 30 is connected. A transmission packet which is input through the transmission port 11 is constituted, for example, to be distributed to the destination through a switch fabric 13 and output to the trunk port 12 which corresponds to the destination.

The router 10 according to the present invention is such that (see FIG. 3) a controller 14, which controls the operation of the router 10, checks the number of VLANs which are distributed by the switch fabric 13 and multiplexed on the same trunk transmission line (physical line) 30, sets queues of predetermined lengths which correspond to the respective VLANs, and that packets which belong to the respective VLANs are distributed to the respective queues 15 using a VLAN classifier 16. The distribution of packets to the queues 15 is executed according to the virtual LAN identifiers VIDs, respectively. Further, the router 10 is such that the packets which are distributed to each queue 15 are fetched by a predetermined number from the queue 15 using an output selector 17 and multiplexed at the trunk port 12 and output.

The weights (bands) of the queues 15 which are set according to the number of VLANs are set by distributing the band held by the trunk transmission line (physical line) 30 at a predetermined rate, e.g., distributing the band equally. In addition, the length of each queue 15 (packet storage capacity) is set so as to be able to hold the communication packets of each VLAN in standard information communication. Accordingly, if packets in larger quantities exceeding the length of the queue 15 are input and overflow the queue 15, then the packets are abandoned. In addition, the fetch of the packets from the queues 15 by the output selector 17 is cyclically conducted according to, for example, round robin scheduling.

Figure 4:
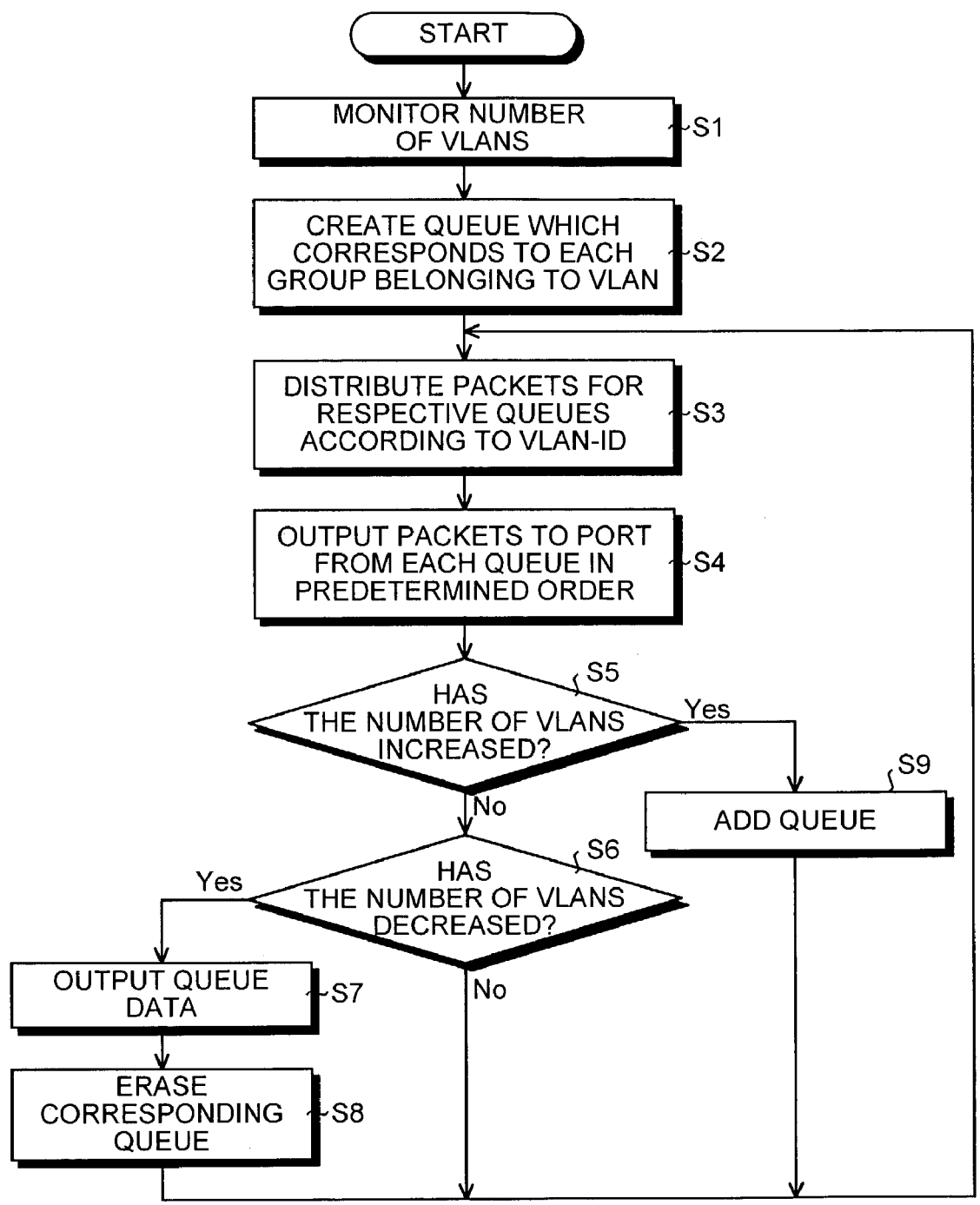
FIG. 4 is a flowchart which shows one example of the operation of the router shown in FIG. 3.

The operation of the router 10 of the network system thus constituted will be explained with reference to the flowchart shown in FIG. 4. This flowchart shows an example in which packets transmitted by the VLANs are only unicast packets.

First, the controller 14 checks the number of VLANs which are distributed by the switch fabric 13 and allocated to the same trunk port 12 (step S1) and creates queues 15 which correspond to the respective VLANs (step S2). The controller 14 actuates the VLAN classifier 16 and distributes the packets to the queues 15 provided for each VLAN according to the VLAN-ID which is included in the frame of each packet (step S3). Specifically, if packets which are transmitted from the terminal 20 are input from the terminal port 11, the switch fabric 13 selects a trunk port 12 according to destination information in the packets. The VLAN classifier 16 which is provided to correspond to the trunk port 12 discriminates the VLAN-IDs in the packets and distributes the packets to the respective queues 15 which are provided to correspond to the VLANs. The output selector 17 fetches the packets which are accumulated in each queue 15 by a predetermined number in a predetermined order which is preset such as according to the round robin scheduling and output to the trunk port 12 (step S4).

On the other hand, the controller 14 monitors the number of VLANs which are multiplexed on the trunk transmission line 30. Namely, the number of VLANs which are multiplexed on the trunk transmission line 30 changes if the administrator of the router 10 sets a new VLAN so as to change the configuration of the network and thereby conversely erases the already existing VLAN settings. The controller 14 determines whether the number of VLANs has increased or decreased (steps S5 and S6). If the number of VLANs has increased, a new queue 15 is added and set (step S9). If the number of VLANs has decreased, the packets which remain in the queue 15 which corresponds to the opened VLAN are output (step S7) and then the queue 15 is erased (step S8) While executing the addition and erasure of the queue 15 as explained above (steps S5 to S9), the controller 14 repeatedly executes packet transmission control shown in the steps S3 to S4. It is noted that this control is conducted for each VLAN group.

According to the router 10, the packets of each VLAN are distributed to the queues 15 which are provided according to the number of VLANs and the packets which are accumulated in each queue 15 are sequentially fetched through the output selector 17 in a predetermined order and output from the trunk port 12. Therefore, even in the network system in which the VLANs are multiplexed at the same physical port, it is possible to distribute and allocate the band of the trunk transmission line 30 for the respective VLANS, thereby preventing a specific VLAN from occupying the physical port. As a result, even if a user of a certain VLAN group transmits heavy traffic data, this data transmission does not hamper the communication held by the other VLAN groups. Therefore, it is possible to ensure fairness among a plurality of VLANs. In addition, since the creation and erasure of the queues 15 are conducted according to the number of VLANs, it is possible to make effective use of the transmission bands of the physical port allocated to the respective VLANs in advance.

In this embodiment, the queues 15 are provided to correspond to the VLANs, respectively and the packets of each VLAN are distributed to each queue 15, thereby ensuring fairness among a plurality of VLANs.

However, the packets which are dealt with by the respective VLANs include unicast packets each of which is received by a single recipient and multicast packets each of which is received by a plurality of recipients. A multicast packet is employed in, for example, VOD (video on demand), live relay or the like and occupies a wider band than that of a unicast packet. Such a multicast packet is normally considered to be different from the unicast packet. Even if multicast packets and unicast packets are destined to the same VLAN at the same port, the router 10 separately switches over them. Due to this, the band of a VLAN which employs both multicast and unicast at the same physical port (trunk transmission line 30) is wider than the band of a VLAN which employs only unicast, with the result that fairness cannot be ensured among a plurality of VLANs.

If the VLANs which include such multicast are to be dealt with, the network system or particularly the router 10 according to the present invention is constituted as in the second embodiment explained below.

Figure 3:
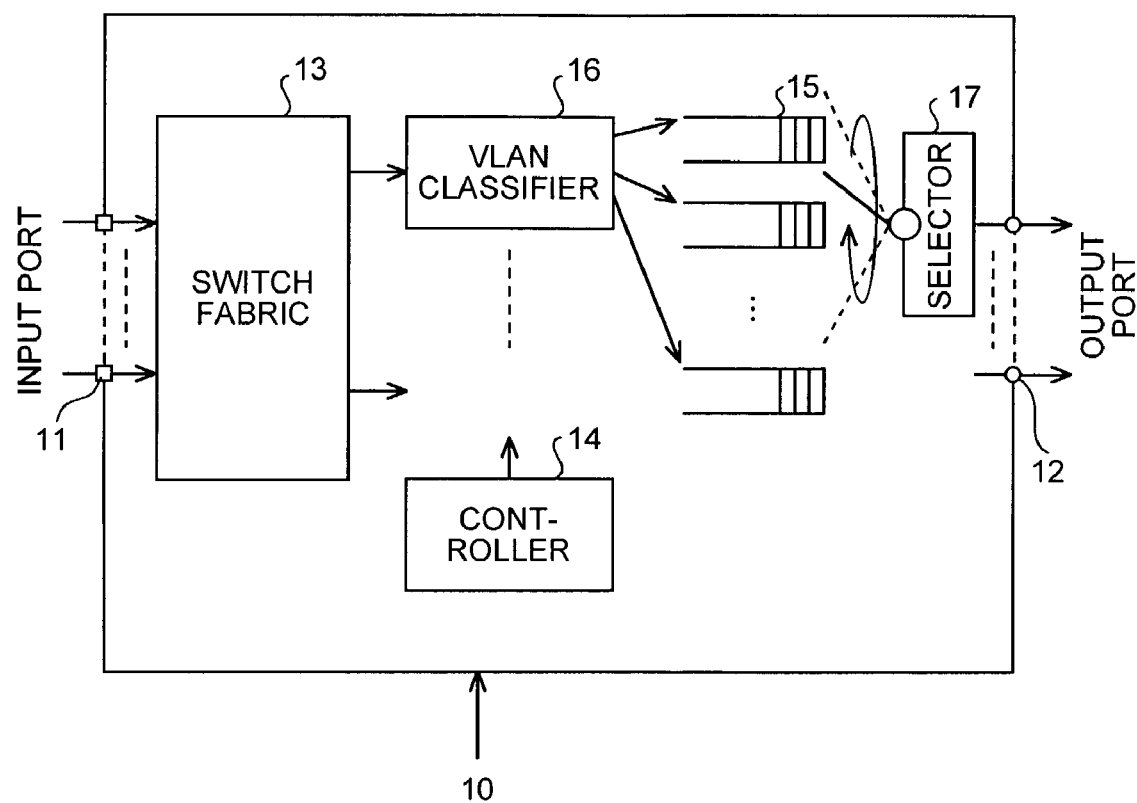
FIG. 3 is a block diagram which shows the schematic configuration of a router which is applied to the network system shown in FIG. 1.

The controller 14 in the router 10 shown in FIG. 3 checks the number of VLANs which are distributed by the switch fabric 13 and multiplexed on the same trunk transmission line (physical line) 30 and checks the number of multicasts which are included in each VLAN. The router 10 creates a queue for multicast and a queue for unicast for each virtual LAN.

The received packets are distributed to the queues 15 which correspond to the unicast and/or multicast in accordance with the virtual LAN identifiers VIDs and destination addresses. The packets (unicast packets or multicast packets) which are distributed to the respective queues 15 are sequentially fetched from the respective queues 15 at a predetermined rate by the output selector 17, thereby multiplexing the queues and outputting them to the trunk port 12. Whether or not a packet is a unicast packet or a multicast packet is identified according to the address type or the like in the packet.

To set a weight (band) to each queue 15, the bands held by the trunk transmission line (physical line) 30 may be distributed to each VLAN at a predetermined rate and then the corresponding bands of the queues 15 for the unicast and the multicast included in each VLAN may be distributed within a range of the bands distributed (allocated) to the respective VLANs. In this case, the weight (band) of each queue 15 may be changed, i.e., each queue 15 may be weighted according to a packet type (unicast packet/multicast packet) That is, the weight (band) of the multicast queue 15 may be set according to the band of the multicast packet and the remaining bands may be allocated to the unicast queue 15, thereby making the multicast queue 15 different in band (weight) from the unicast queue 15.

For each VLAN, as explained above, the queues 15 which correspond to the number of multicast addresses distributed to each VLAN are set and packets are distributed to these queues 15. By doing so, even if the number of multicasts included in each VLAN differ among a plurality of VLANs, fairness can be ensured among a plurality of VLANs since the bands held by the trunk transmission line (physical line) 30 is distributed to the respective VLANs according to the number of VLANs. Accordingly, the present invention has advantages in, for example, that even if multicasts are included, the transmission of information in the VLAN which includes only unicasts is not hampered.

Figure 5:
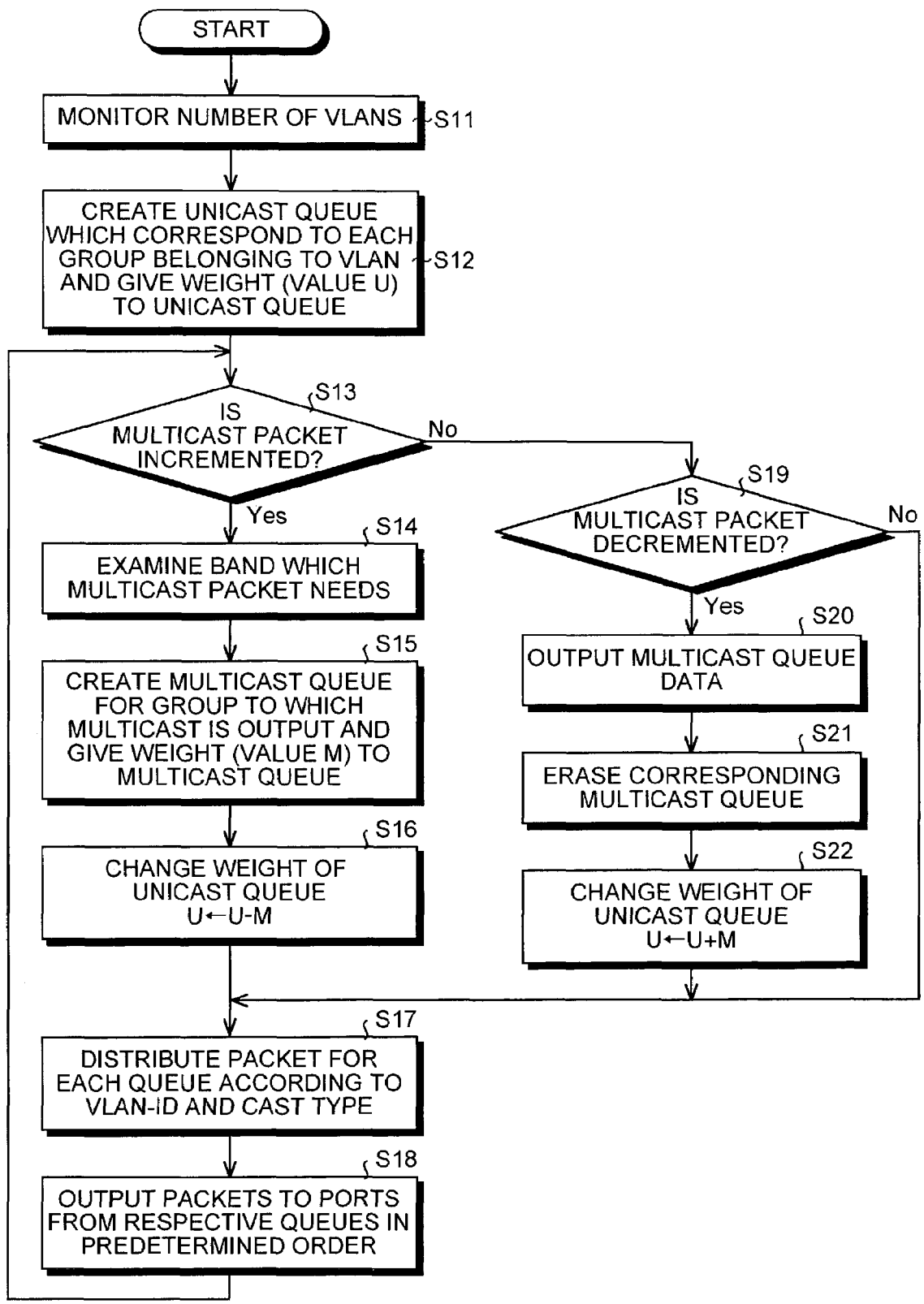
FIG. 5 is a flowchart which shows one example of the operation of the router shown in FIG. 3 which transmits a multicast frame.

FIG. 5 shows one example of the processing procedures of the router 10 which executes the control as explained above. The processing procedures will be explained. First, the number of VLANs is checked (step S11). Unicast queues 15 which correspond to unicast packets are created for each VLAN and the queues 15 are weighted by numeric values (step S12). The weighting numeric values are set U while assuming that the bands of the trunk transmission line 30 are equally divided according to the number of VLANs.

The router 10 then checks whether or not a multicast packet transmission request is issued for each VLAN (step S13). If there is a multicast packet transmission request, a transmission band which a multicast packet needs is inquired to a server or the like (not shown) which manages the multicast packet (step S14). Specifically, the router 10 inquires the server or the like, which manages the multicast using a unit such as RADIUS, of the transmission band which the multicast packet needs, and receives the transmission band which the multicast packet needs.

A multicast queue 15 is added to the VLAN which the terminal 20 which transmits the multicast packet belong to and the weight of this multicast queue 15 is set at M according to the band examined as explained above (step S15).

The weight M which is allocated to the multicast queue is subtracted from the weight U which is previously allocated to the unicast queues 15, thereby changing the weight of the unicast queue 15 (step S16). In other words, weights of the queues 15 are reallocated within a range of the weights which are first allocated to each group to which the VLAN belongs. Specifically, if the band which is allocated to the VLAN is 100 Mbps, a weight [U=100] is allocated to the unicast queue 15. If the transmission of a multicast packet which needs a transmission band of 5 Mbps becomes necessary, a multicast queue 15 is prepared and the weight of the multicast queue 15 is set at [M=5]. The weight of the unicast queue 15 is then changed to [U−M=100−5=95].

Thereafter, the weighted queues 15 which are created for each VLAN group are distributed according to the VLAN-IDs and destination addresses in the respective packets which are input from the terminal port 11 (step S17). The output selector 17 of the router 10 fetches the packets which are distributed to the respective queues 15 according to predetermined procedures and outputs the fetched packets from the trunk port 12 (step S18). To fetch the packets from the respective queues 15, the round robin scheduling is employed, for example. Alternatively, fair queuing scheduling such as time stamp scheduling may be employed.

If the transmission of a multicast frame becomes unnecessary (step S19), the router 10 outputs the multicast packets remaining in the corresponding multicast queue (step S20). The router 10 erases the multicast queue (step S21). The weight M of the erased multicast frame is added to the weight U of the unicast queue (step S22).

Thereafter, the router 10 distributes the respective weighted queues 15 which are created for each VLAN group (step S17). The output selector 17 of the router 10 fetches the packets which are distributed to the respective queues 15 according to predetermined procedures and outputs the fetched packets from the trunk port 12 (step S18).

According to this weighting control, as FIG. 6 shows the concept, the band W which the physical port (trunk transmission line 30) holds can be distributed and the distributed bands can be set as bands WA, WB and WC which are to be allocated to three VLANs, VLAN-A, VLAN-B and VLAN-C, respectively, multiplexed at this physical port to satisfy [W=WA+WB+WC]. The bands WA, WB and WC allocated to the respective VLANs can be distributed for the VLANs and the bands of the queues 15 which belong to each VLAN can be individually set.

Specifically, bands Wa1, Wa2 and Wa3 to be respectively allocated to one unicast queue and two multicast queues which belong to the VLAN-A can be set to satisfy [WA=Wa1+Wa2+Wa3]. In addition, bands Wb1 and Wb2 to be respectively allocated to one unicast queue and two multicast queues which belong to the VLAN-B can be set to satisfy [WB=Wb1+Wb2] and bands Wc1 to be allocated to one unicast queue which belongs to the VLAN-C can be set to satisfy [WC=Wc1].

It only suffices that the number of queues 15 is changed according to the number of cast types included in the each VLAN and that the band which is allocated to the VLAN is distributed to these queues 15. Therefore, the increase and decrease of the cast types do not influence the other VLANs. As a result, it is possible to simplify fairness among a plurality of VLANs and to effectively ensure the fairness.

Accordingly, even in the network system for multiplexing a plurality of VLANs at the same physical port and transmitting data, the queues 15 are weighted within a range of the transmission band which is allocated in advance for each of a plurality of VLANs and the band does not, therefore, exceed the transmission band of the physical port. In addition, the output selector 17 of the router 10 functions to fetch the weighted queues according to the weights and to output the fetched queues to the trunk port 12. Therefore, even if packets in large quantities using multicast packets are to be transferred, the physical port is not occupied by a specific terminal and this transfer does not hamper the communication of the other VLAN users.

Moreover, the present invention is not limited to VLANs on the trunk transmission line side as explained above. If switching hubs, routers or the like are cascade-connected on the branch transmission line side to thereby constitute VLANs, for example, it is possible to ensure fair transmission control among a plurality of VLANs for the use of the band of the branch transmission line by applying the network system of the present invention to transmission control for the branch transmission line.

The present invention can be constituted not only as a network system but also a method invention. In addition, the present invention can be constituted as a computer program for allowing a computer to realize the method itself.

The present invention can be realized in various manners such as the free setting of a transmission band for each VLAN, within the scope of the present invention.

As explained so far, according to the network system of the present invention, even a transmission system in which a plurality of VLANs are multiplexed at the same physical port can conduct transmission control so as to prevent a specific VLAN from occupying the physical port. Therefore, even if a certain VLAN user transmits data in large quantities, this transmission does not hamper the communication held by the other VLAN users.

Moreover, even if terminals which belong to the same VLAN transmit packets in large quantities as multicast packets, the physical port is not occupied by the VLANs. Therefore, the communication held by the other VLAN users or that of the VLANs which belong to the other groups are not hampered and fair transmission control can be ensured. In this way, the present invention exhibits a lot of practical advantages.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A network system which multiplexes a plurality of virtual local area networks at a same physical port and transmits packets to the virtual local area networks, the network system comprising:
   a queue creation unit which creates queues which correspond to the respective virtual local area networks in accordance with the number of the multiplexed virtual local area networks;
   a packet distribution unit which distributes received packets to the queues of the virtual local area networks, to which the packets belong, in accordance with a virtual local area network identification number and a destination address included in each of the received packets; and
   a packet output unit which outputs the packets, which are distributed to the queues, from each of the queues in a predetermined order.

2. The network system according to claim 1, wherein each of the queues has a preset length, and if the received packets cannot be stored in the queues of the virtual local area networks to which the received packets belong, the packet distribution unit abandons the packets.

3. The network system according to claim 1, wherein the packet output unit sequentially fetches a predetermined number of packets from each of the queues by round-robin scheduling and outputs the fetched packets.

4. A network system which multiplexes a plurality of virtual local area networks at a same physical port and transmits packets to the virtual local area networks, the network system comprising:
   a queue creation unit which creates queues which correspond to multicast groups delivered to each of the multiplexed virtual local area networks for each virtual local area network in accordance with the number of the multicast groups;
   a packet distribution unit which distributes received packets to the corresponding queues in accordance with a virtual local area network identification number and a destination address included in each of the received packets if the received packets are destined to one of the multicast groups; and
   a packet output unit which outputs the packets respectively distributed to the queues from each of the queues in a predetermined order.

5. The network system according to claim 4, wherein the queue creation unit distributes weights of the queues to be allocated to each of the virtual local area networks in accordance with the number of the virtual local area networks, and creates the queues which correspond to one or both of unicast and multicast included in each of the virtual local area networks within a range of the distributed weights.

6. The network system according to claim 4, wherein if one of the virtual local area networks includes unicast and multicast, the queue creation unit sets a weight of the queue for the multicast in accordance with a multicast band and allocates a remaining weight to the queue for the unicast.

7. The network system according to claim 4, wherein the multicast band is obtained from a server which manages multicast bands.

8. The network system according to claim 4, wherein the packet output unit sequentially fetches the packets from the respective queues each weighted according to a queue type by round-robin scheduling and outputs the fetched packets.

9. A transmission method for multiplexing a plurality of virtual local area networks at a same physical port and transmitting packets to the virtual local area networks, the transmission method comprising:
   a queue creation step of creating queues which correspond to the respective virtual local area networks in accordance with the number of the multiplexed virtual local area networks;
   a packet distribution step of distributing received packets to the queues of the virtual local area networks to which the packets belong, in accordance with a virtual local area network identification number and a destination address included in each of the received packets; and
   a packet output step of outputting the packets which are distributed to the queues from each of the queues in a predetermined order.

10. The method according to claim 9, wherein each of the queues has a preset length, and if the received packets cannot be stored in the queues of the virtual local area networks to which the received packets belong, the packets are abandoned at the packet distribution step.

11. The method according to claim 9, wherein
at the packet output step, a predetermined number of packets are sequentially fetched from each of the queues by round-robin scheduling and output.

12. A transmission method for multiplexing a plurality of virtual local area networks at a same physical port and transmitting packets to the virtual local area networks, the transmission method comprising:
a queue creation step of creating queues which correspond to multicast groups delivered to each of the multiplexed virtual local area networks for each virtual local area network in accordance with the number of the multicast groups;
a packet distribution step of distributing received packets to the corresponding queues in accordance with a virtual local area network identification number and a destination address of each of the received packet if the received packets are destined to one of the multicast groups; and
a packet output step of outputting the packets respectively distributed to the queues from each of the queues in a predetermined order.

13. The method according to claim 12, wherein
at the queue creation step, weights of the queues to be allocated to each of the virtual local area networks are distributed in accordance with the number of the virtual local area networks, and the queues which correspond to one or both of unicast and multicast included in each of the virtual local area networks are created within a range of the distributed weights.

14. The method according to claim 12, wherein
at the queue creation step, if one of the virtual local area networks includes unicast and multicast, a weight of the queue for the multicast is set in accordance with a multicast band and a remaining weight is allocated to the queue for the unicast.

15. The method according to claim 12, wherein
the multicast band is obtained from a server which manages multicast bands.

16. The method according to claim 12, wherein
at the packet output step, the packets are sequentially fetched from the respective queues each weighted according to a queue type by round-robin scheduling and output.

17. A controller for multiplexing a plurality of virtual local area networks at a same physical port and transmitting packets to the virtual local area networks, the controller comprising:
a queue creation mechanism configured to create queues which correspond to the respective virtual local area networks in accordance with the number of the multiplexed virtual local area networks;
a packet distribution mechanism configured to distribute received packets to the queues of the virtual local area networks to which the packet belong, in accordance with a virtual local area network identification number and a destination address included in each of the received packets; and
a packet output mechanism configured to output the packets which are distributed to the queues from each of the queues in a predetermined order.

18. A controller for multiplexing a plurality of virtual local area networks at a same physical port and transmitting packets to the virtual local area networks, the controller comprising:
a queue creation mechanism configured to create queues which correspond to multicast groups delivered to each of the multiplexed virtual local area networks for each virtual local area network in accordance with the number of the multicast groups;
a packet distribution mechanism configured to distribute received packets to the corresponding queues in accordance with a virtual local area network identification number and a destination address included in each of the received packets if the received packets are destined to one of the multicast groups; and
a packet output mechanism configured to output the packets respectively distributed to the queues from each of the queues in a predetermined order.

* * * * *